March 10, 1964 L. G. FREEMAN 3,123,990
LUBRICATION ARRANGEMENT FOR TELESCOPING SHAFTS
Filed July 20, 1961
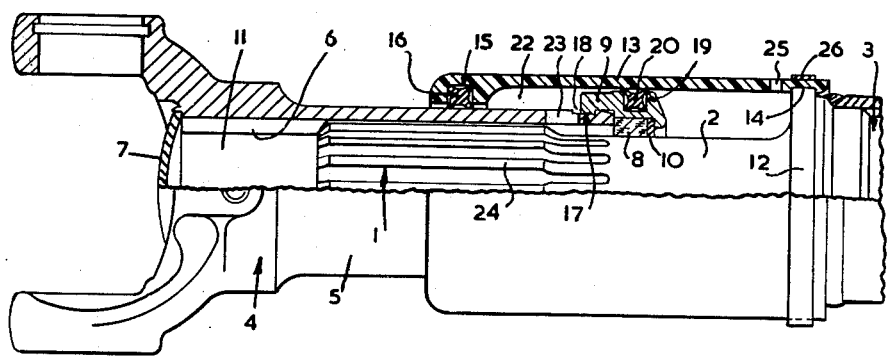

United States Patent Office 3,123,990
Patented Mar. 10, 1964

3,123,990
LUBRICATION ARRANGEMENT FOR TELESCOPING SHAFTS
Leslie Gaillard Freeman, Berkswell, England, assignor to Birfield Engineering Limited, London, England
Filed July 20, 1961, Ser. No. 125,496
9 Claims. (Cl. 64—23)

This invention relates to mechanisms of the kind comprising a plunger sliding within a cylinder and to the lubrication of such mechanisms, and is an improvement in or modification of the invention disclosed in our co-pending patent application No. 817,388, filed June 1, 1959, now Patent No. 3,063,266.

There is described in the aforesaid application No. 817,388 a lubrication arrangement for a mechanism of the kind set forth wherein one end of the cylinder is completely closed and a chamber is formed between the cylinder and the plunger sliding therein, the arrangement being such that air and lubricant are able to escape from the closed end of the cylinder into said chamber when the plunger moves towards said closed end and to return to the closed end of the cylinder again when the plunger is withdrawn therefrom, the sum of the clearance volume within the cylinder and the volume of the chamber remaining substantially constant.

According to the present invention the chamber of such an arrangement surrounds the cylinder and is formed between the wall thereof and an outer sleeve-like section of the plunger.

The cross-sectional area of the chamber is substantially equal to the effective cross-sectional area of the plunger so that as the latter slides within the cylinder the rate of change of the clearance volume at the closed end of the cylinder varies inversely as that of the volume of the chamber.

Preferably the ends of the chamber are defined by flexible seals respectively arranged adjacent the open end of the cylinder and the open end of said section, and the chamber conveniently communicates with the clearance volume of the cylinder through an aperture in the cylinder wall.

One embodiment of the invention, as carried into effect in connection with the conventional arrangement of universal joint and sliding spline disposed at the front end of a motor vehicle propeller shaft, will now be described by way of example with reference to the accompanying drawing. In the drawing the arrangement is shown in side view, half in axial section.

In accordance with common practice the sliding spline 1 is formed at the end of a forwardly projecting male portion 2 of the propeller shaft 3, and the spline yoke 4 also forms the rear yoke member of the front universal joint of the shaft. The yoke member 4 has a tubular extension 5 which is internally splined for splined engagement with the male portion 2.

The spline yoke 4 has the inner end of its bore 6 closed by a blanking plate 7 as usual but, contrary to normal practice, the normal small air-escape hole is eliminated therefrom. Hence the plate 7 completely seals the inner end of the bore 6 to form a closed clearance volume 11 within the latter between the plate 7 and the inner end of the portion 2.

The other end of the spline yoke 4 is provided with a cork sealing ring 8 held in place by a ferrule 9 and retaining washer 10 to provide a seal around the forwardly projecting male portion 2. The splined section of the portion 2 works within the splined bore 6, so that the spline yoke 4 forms the cylinder and the rear section of the shaft including the male portion 2 forms the plunger of a mechanism of the kind hereinbefore referred to.

A peripheral flange 12 formed adjacent the rear end of the male portion 2 carries a forwardly projecting sleeve 13 of plastic material forming a separate sleeve-like section of the plunger mounted on the remainder or main portion of the latter. At its rear end the sleeve 13 has an internal annular recess 14 which during assembly snaps into position on the flange 12 and is secured by a ring 26. At its forward end the sleeve 13 is moulded with an internal annular groove 15 which provides a housing for a resilient lip-type seal 16 engaging the outer cylindrical surface of the spline yoke extension 5.

The ferrule 9 is also formed from plastic material and arranged to snap into position on the rear end of the spline yoke 4, to this end the ferrule being moulded with an internal lip 17 which engages an external annular groove 18 in the yoke member 4. The ferrule is also moulded with an external annular groove 19 which provides a housing for a further resilient lip-type seal 20 engaging the inner surface of the sleeve 13 so that a lubricant retaining chamber 22 is formed externally of the spline yoke 4 between the two seals 16 and 19 within the sleeve 13 and around the spline yoke 4.

The chamber 22 communicates with the clearance volume 11 at the inner end of the bore 6 through a radial bore 23 forming an aperture in the wall of the yoke extension 5 adjacent the rear end of the latter, and one of the normal splines such as 24 which would be in alignment with this radial bore 23 is omitted to provide a free passage between the clearance volume 11 and the bore 23.

Both the resilient seals 16 and 20 are provided by rings of identical form moulded in a material such as synthetic rubber, and they are of generally square cross-section with the corners moulded to form wiping lips so that each ring provides a double-acting reliable and efficient sliding seal. Vent holes such as 25 in the wall of the sleeve 13 adjacent the flange 12 vent the otherwise closed space formed at the inner end of the sleeve 13 around the shaft portion 2. The cork seal 8 prevents lubricant entering this closed space or any dirt which may enter the latter contaminating the sliding spline 1.

The internal diameter of the sleeve 13 is such that the maximum volume of the chamber 22 when the portion 2 is fully home within the yoke 4 is approximately equal to the maximum value of the clearance volume 11 when the portion 2 is in its position of maximum withdrawal. In addition, the cross-sectional area of the chamber 22, i.e. the clearance area between the sleeve 13 and spline yoke extension 5, is substantially equal to the effective cross-sectional area of the splined section of the male portion 2. Thus during movement of the plunger within the cylinder there is no tendency for pressure to build up in the lubricant with which the arrangement is packed on assembly; this lubricant is merely transferred back and forth between the clearance volume 11 and the chamber 22.

I claim:
1. A mechanism comprising a cylinder one end of which is closed, and a plunger sliding within said cylinder with a sleeve-like section defining a chamber surrounding at least a portion of said cylinder and in communication with the clearance volume at said closed end of said cylinder, and means maintaining the sum of said clearance volume and the volume of said chamber substantially constant during sliding movement of said plunger within said cylinder.

2. A mechanism comprising a cylinder having an open end and a closed end, a plunger sliding within said cylinder and projecting through said open end thereof, said plunger having a sleeve-like portion surrounding at least a portion of said cylinder, and flexible seals respectively mounted on said cylinder adjacent the open end thereof and on said sleeve-like portion adjacent the opposite end thereof, said flexible seals defining the ends of a lubricant retaining chamber formed between said cylinder and said sleeve-like portion and in communication with the clearance volume at the inner end of said cylinder, the arrangement being such that the sum of said clearance volume and the volume of said chamber remains substantially constant during sliding movement of said plunger within said cylinder.

3. A mechanism according to claim 2, wherein said chamber and said clearance volume communicate through an aperture in a wall of said cylinder, and a further flexible seal is provided between said cylinder and said plunger on the outer side of said aperture.

4. A mechanism according to claim 3, wherein a ferrule is fitted to said open end of said cylinder and acts to retain said further flexible seal in position, said ferrule being formed to provide a housing for said first-mentioned flexible seal.

5. A mechanism comprising a cylinder defined by a cylinder wall and having a closed inner end, a plunger comprising a male portion projecting through the outer end of said cylinder and sliding within said cylinder and a separate sleeve-like portion mounted on said male portion, said sleeve-like portion surrounding at least a portion of said cylinder wall and being spaced therefrom to defined a lubricant retaining chamber surrounding said cylinder within said sleeve-like portion, said chamber being in communication with the clearance volume formed between the inner end of said cylinder and said male portion and means maintaining the sum of said clearance volume and the volume of said chamber substantially constant during sliding movement of said plunger.

6. A mechanism comprising a cylinder having a closed inner end, a plunger comprising a male portion projecting through the outer end of said cylinder so as to slide within said cylinder and a sleeve-like portion mounted on said male portion, said sleeve-like portion being moulded from synthetic plastic material with an internal peripheral groove adjacent each end of the portion, one of said grooves remote from said cylinder engaging an outer peripheral flange on said male portion to retain said sleeve-like portion in position, said sleeve-like portion surrounding at least a portion of said cylinder and being spaced therefrom to provide an annular lubricant retaining chamber within said sleeve-like portion in communication with the inner end volume of said cylinder, a flexible seal positioned in the other of said grooves to define one end of said chamber, and a further flexible seal mounted adjacent the outer end of said cylinder to define the opposite end of said chamber, the cross-sectional area of said chamber being substantially equal to the effective cross-sectional area of said male portion within said cylinder.

7. A mechanism comprising a cylinder member one end of which is closed, a plunger member having a portion thereof slidably received within said cylinder member, a sleeve like member carried by said plunger member and defining a chamber surrounding at least a portion of said cylinder member, said chamber being in communication with the clearance volume at the closed end of said cylinder member, air escape means carried by one of said members, and means maintaining the sum of said clearance volume and the volume of said chamber substantially constant during sliding movement of said plunger member within said cylinder member and sealing said chamber from said air escape means.

8. A mechanism comprising a cylinder member having a closed end, a plunger member including a portion projecting into the outer end of said cylinder member and slidably received therein, a sleeve member mounted on said plunger member, said sleeve member surrounding at least a portion of said cylinder member and being spaced therefrom, a first and a second seal disposed in axial spaced relationship and engaging said sleeve member and said cylinder member to provide a lubricant retaining chamber within said sleeve member, access means communicating the inner end volume of said cylinder member and said lubricant retaining chamber, a third seal engaging said cylinder member and said plunger member to prevent the escape of lubricant therebetween, and air escape means carried by one of said members and being sealed from said annular lubricant retaining chamber and the inner end volume of said cylinder member by at least one of said seals.

9. A mechanism comprising a cylinder one end of which is enclosed, a plunger sliding within said cylinder with a sleeve-like section defining a chamber surrounding at least a portion of said cylinder and in communication with the clearance volume at said closed end of said cylinder, and maintaining means including a plurality of axially spaced sealing means maintaining the sum of said clearance volume and the volume of said chamber substantially constant during sliding movement of said plunger within said cylinder, said chamber and said clearance volume communicating through an aperture in the wall of said cylinder and said aperture being disposed between at least two of said sealing means.

References Cited in the file of this patent
UNITED STATES PATENTS

| | | |
|---|---|---|
| 1,496,236 | Laughlin | June 3, 1924 |
| 1,541,007 | Thiemer | June 9, 1925 |
| 1,973,702 | Cooke | Sept. 18, 1934 |
| 2,064,392 | Swenson et al. | Dec. 15, 1936 |
| 2,116,290 | Spicer | May 3, 1938 |